(12) United States Patent
Liang et al.

(10) Patent No.: US 9,973,973 B2
(45) Date of Patent: May 15, 2018

(54) SIGNAL PROCESSING DEVICES AND METHODS

(71) Applicant: MediaTek Singapore Pte. Ltd., Singapore (SG)

(72) Inventors: Jiye Liang, Beijing (CN); Wei-De Wu, Hsinchu (TW); Jinghu Chen, San Diego, CA (US); Chia-Wei Tai, Kaohsiung (TW); Hsiang Sheng Hu, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 88 days.

(21) Appl. No.: 15/244,183

(22) Filed: Aug. 23, 2016

(65) Prior Publication Data

US 2017/0164240 A1    Jun. 8, 2017

(30) Foreign Application Priority Data

Dec. 4, 2015   (CN) .......................... 2015 1 0886119

(51) Int. Cl.
| | |
|---|---|
| *H04W 28/22* | (2009.01) |
| *H04L 5/00* | (2006.01) |
| *H04W 72/04* | (2009.01) |
| *H04W 24/08* | (2009.01) |

(52) U.S. Cl.
CPC ............. *H04W 28/22* (2013.01); *H04L 5/00* (2013.01); *H04W 24/08* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 2006/0107165 | A1* | 5/2006 | Murata | H04L 1/1812 714/748 |
| 2011/0280296 | A1* | 11/2011 | Wang | H04L 1/0032 375/227 |
| 2012/0201216 | A1* | 8/2012 | Wu | H04L 1/0072 370/329 |
| 2014/0321421 | A1* | 10/2014 | Popovic | H04L 5/0051 370/330 |

\* cited by examiner

*Primary Examiner* — Faruk Hamza
*Assistant Examiner* — Cassandra L Decker
(74) *Attorney, Agent, or Firm* — McClure, Qualey & Rodack, LLP

(57) ABSTRACT

A signal processing device for communication is provided and includes a de-rate matching module, a decoder, a signal-quality generation module, and a first control module. The de-rate matching module performs a de-rate matching operation on the control signal to obtain a de-rate matching signal. The decoder performs a decoding operation on the de-rate matching signal to obtain a decoding signal. The signal-quality generation module generates at least one signal-quality indicator according to the control signal and the de-rate matching signal. The at least one signal-quality indicator includes a similarity indictor which is obtained by the signal-quality generation module performing a similarity calculation operation on the control signal and the de-rate matching signal. The first control module determines and controls whether to stop the decoding operation for the de-rate matching signal of the current control signal according to the at least one signal-quality indicator.

20 Claims, 6 Drawing Sheets

SIGNAL PROCESSING DEVICES AND METHODS

CROSS REFERENCE TO RELATED APPLICATIONS

This application claims priority of China Patent Application No. 201510886119.8, filed on Dec. 4, 2015, the entirety of which is incorporated by reference herein.

BACKGROUND OF THE INVENTION

Field of the Invention

The invention relates to a communication technique, and more particularly, to a signal processing method and device.

Description of the Related Art

Currently, signals are transmitted between terminal devices (e.g. user equipment (UE)) and corresponding base station (BS) (e.g. Evolved Node B (eNB)) to achieve communications. The receiver (either the UE or the BS) needs to perform a series of signal processing operations on the received signals. For example, while in communication with the BS, the UE performs the detection and the decoding operation for the physical downlink control channel (PDCCH) messages to obtain downlink control information (DCI), which is sent by the base station through the PDCCH. However, in current long term evolution (LTE) communication systems, since a plurality of terminals (UE) may connect to the same base station (e.g. Evolved Node B (e-NB)), the DCI sent by the BS through the PDCCH comprises resource allocation information and other control information for one or more UE, and the DCI messages for different UEs may be received by each UE connected to the BS. Thus, in a given transmission time interval (TTI) and/or time slot (TS), the terminal (UE) needs to detect and decode all PDCCH data and obtain the DCI required for itself according to all decoded PDCCH data.

However, a part of the DCI obtained by decoding all PDCCH data may be repeated or may not correspond to the current terminal (UE). The detection and decoding operation performed on this part causes a waste of computing resources and power, and costs considerable time period required for the terminal (UE) to obtain valid information, which affects the performance of the terminal and limits the user experience.

BRIEF SUMMARY OF THE INVENTION

Thus, the present invention provides a signal processing method and device, which can decrease the number of times required to perform a decoding operation and shorten the time period required for obtaining valid information, thereby improving the efficiency of the signal detection.

An exemplary embodiment of a signal processing device for communication is provided. The signal processing device comprises a control-signal detection module which detects and decodes a control signal. The control-signal detection module comprises a de-rate matching (De-RM) module, a decoder, a signal-quality generation module, and a first control module. The de-rate matching module performs a de-rate matching operation on the control signal which is obtained after a demodulation operation to obtain a de-rate matching signal of the control signal. The decoder is coupled to the de-rate matching module. The decoder performs a decoding operation on the de-rate matching signal to obtain a decoding signal of the control signal. The signal-quality generation module is coupled to the de-rate matching module. The signal-quality generation module generates at least one signal-quality indicator according to the control signal and the de-rate matching signal of the control signal. The at least one signal-quality indicator comprises a similarity indictor which is obtained by the signal-quality generation module performing a similarity calculation operation on the control signal and the de-rate matching signal. The first control module is coupled to the signal-quality generation module and the decoder. The first control module determines and controls whether to stop the decoding operation for the de-rate matching signal of the current control signal according to the at least one signal-quality indicator.

An exemplary embodiment of a signal processing method for communication. The signal processing method comprises detecting and decoding a control signal. The step of detecting and decoding the control signal comprises the step of performing a de-rate matching operation on the control signal which is obtained after a demodulation operation to obtain a de-rate matching signal of the control signal; performing a decoding operation on the de-rate matching signal to obtain a decoding signal of the control signal; generating at least one signal-quality indicator according to the control signal and the de-rate matching signal of the control signal, wherein the at least one signal-quality indicator comprises a similarity indictor which is obtained by performing a similarity calculation operation on the control signal and the de-rate matching signal; and determining and controlling whether to stop the decoding operation for the de-rate matching signal of the current control signal according to the at least one signal-quality indicator.

According to the embodiments, before the signal to be processed is decoded, the quality of the signal to be processed can be estimated first. It is determined whether to stop or suspend the detection and the decoding operation for the PDCCH data. Compared with the conventional manner of decoding all of the signals to be processed, using the signal processing device and method of the embodiment, the number of times required to perform the decoding operation can be decreased, which shortens the time period required for obtaining valid information, thereby improving the efficiency of the signal detection and effectively enhancing the user experience.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
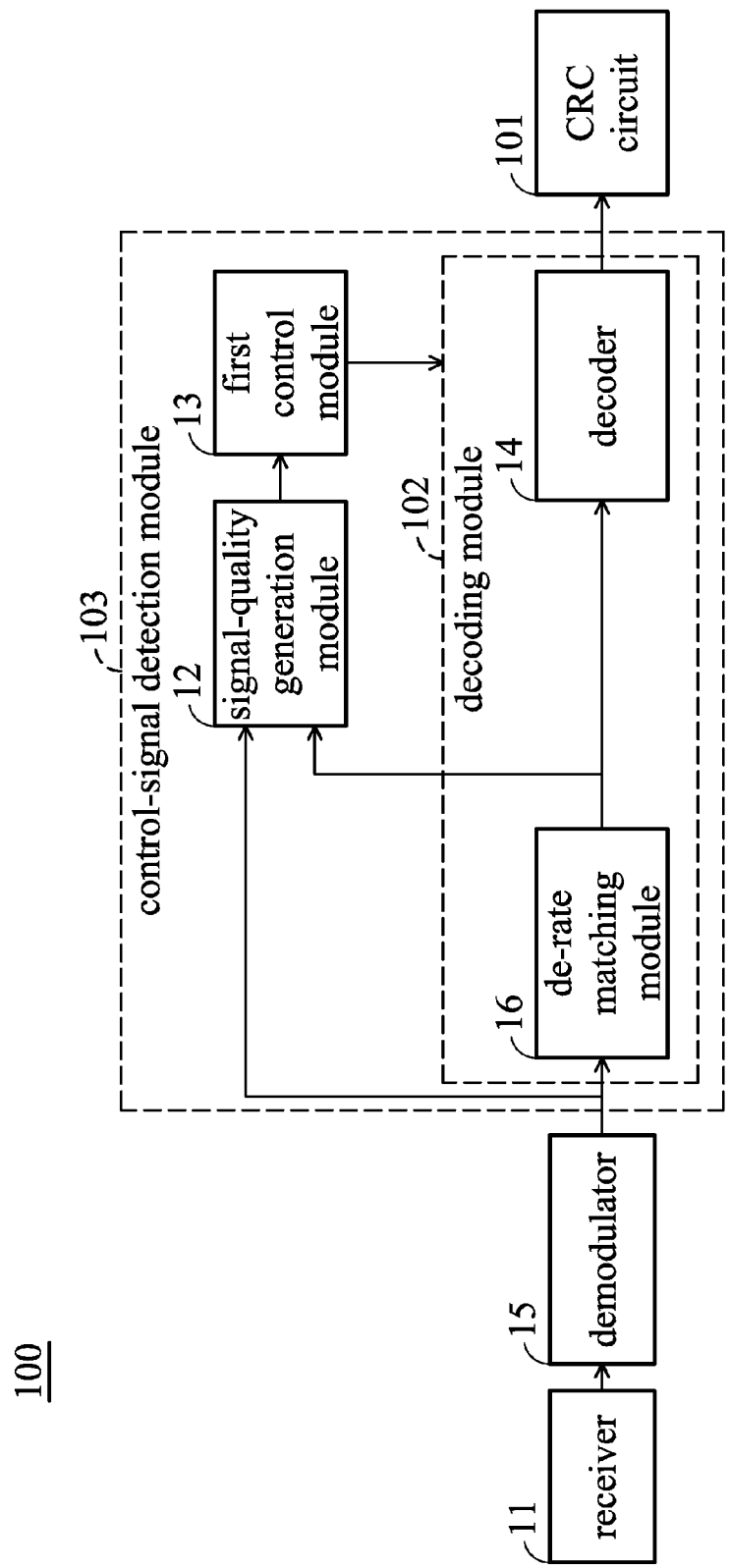
FIG. 1 shows one exemplary embodiment of a signal processing device.

To better understand the technical aspect of the present invention, the following embodiments of the invention will be described in detail by referring to the drawings.

Certain terms are used throughout the specification and following claims to refer to particular components. As one skilled in the art will appreciate, manufacturers may refer to a component by different names. The specification and following claims do not intend to distinguish between components that differ in name but not function. In the following description and in the claims, the terms "include" and "comprise" are used in an open-ended fashion, and thus should be interpreted to mean "include, but not limited to . . . ". "Approximately" is intended to mean an acceptable error range, and those skilled in the art can solve technical problems within a certain error range to achieve the technical effect. Also, the term "couple" is intended to mean either an indirect or direct electrical connection. Accordingly, if a first device couples to a second device, that connection may be through a direct electrical connection, through an indirect electrical connection via other devices and connections. The following description is made for the purpose of illustrating the general principles of the invention and should not be taken in a limiting sense. The scope of the invention is best determined by reference to the appended claims.

It should be understood that the term "and/or" relationship is merely a description of the associated objects, which indicates that there are three relationships between the associated objects. For example, A and/or B can be expressed as three cases: the presence of A alone, the presence of both of A and B, and the presence of B alone. In addition, this character "/", is generally expressed as an "or" relationship between associated objects. The terminology used in the embodiments of the present invention is merely for the purpose of describing particular embodiments, and is not intended to limit the invention. The singular form of the book "an", "said" and "the" used in the embodiments and the appended claims are also intended to include plural forms unless the context clearly indicates otherwise. It should be understood that, the embodiment of the present invention may employ the terms "first", "second" etc. to distinguish the components, modules, or operations which have the same names, but these terms should not limit the order relationship between them. Depending on the context, the word "if" as used herein can be interpreted as "when . . . " or "while . . . " or "in response to the determination of . . . " or "in response to the detection of . . . ". Similarly, depending on the context, the short context "if it is determined that . . . " or "if it is detected that (the described condition or event)" can be interpreted as "when it is determined that . . . " or "in response to the determination of . . . " or "when it is detected that (the described condition or event)" or "in response to the detection of (the described condition or event)".

FIG. 1 shows an exemplary embodiment of a signal processing device 100. In the embodiment, the signal processing device 100 is a communication device or a portion of the communication device. The communication device can be a notebook computer, a mobile phone, a portable gaming device, a portable multimedia player, a global positioning system (GPS), a receiver, a personal digital assistant (PDA), a desktop computer, or other similar devices. As shown in FIG. 1, the signal processing device 100 comprises a receiver 11, a demodulator 15, and a control-signal detection module 103.

The receiver 11 may comprise a radio-frequency (RF) processing circuit (not shown) and a baseband processing circuit (not shown) for receiving the downlink signals from network and performing RF process and baseband process on the received signals. For example, the receiver 11 converts an RF signal, which is received via an antenna of the signal processing device 100, into a baseband signal and performs baseband process on the baseband signal. The baseband process includes, for example, analog-to-digital (ADC) conversion, gain adjustment, modulation, decoding, and the like. The receiver 11 may comprise a plurality of hardware components for performing RF conversion and baseband-signal processing. According to an exemplary embodiment, the receiver 11 may also comprise at least one antenna (not shown).

The demodulator 15 is coupled to the receiver 11. The demodulator 15 demodulates the downlink signal from the receiver 11, which has been processed by the RF process and the baseband process, to obtain a downlink control information (DCI) signal in the demodulated downlink signal. Further, the obtained DCI signal is transmitted to a decoding module 102 in the control-signal detection module 103 for a decoding process.

In the embodiment, the control-signal detection module 103 is configured to detect the DCI signal transmitted on a physical downlink control channel (PDCCH) and decode the DCI signal. As shown in FIG. 1, the control-signal detection module 103 comprises a decoding module 102, a signal-quality generation module 12, and a first control module 13. The decoding module 102 receives the DCI signal which is obtained through the demodulation operation and performs a decoding operation on the DCI signal. The decoding module 102 comprises a de-rate matching module 16 and decoder 14. The de-rate matching module 16 is used to perform a de-rate matching operation on the DCI signal which obtained after the demodulation operation to obtain a de-rate matching signal of the DCI signal. The decoder 14 is coupled to the de-rate matching module 16 for decoding the de-rate matching signal from the de-rate matching module 16 to obtain a DCI decoding signal. As shown in FIG. 1, the signal-quality generation module 12 is coupled to both the input and the output of the de-rate matching module 16 for receiving the DCI signal and the de-rate matching signal thereof. The signal-quality generation module 12 generates at least one signal-quality indicator according to the DCI signal before the de-rate matching operation and the de-rate matching signal of the DCI signal. The first control module 13 is coupled to the signal-quality generation module 12 and the decoding module 102. The first control module 13 determines and controls whether to stop the current decoding operation according to the signal-quality indicator received from the signal-quality generation module 12.

According to an embodiment, the signal-quality generation module 12 calculates a similarity between the DCI signal before the de-rate matching operation and the de-rate matching signal of the DCI signal to obtain a similarity indicator. The similarity indicator can be involved in the signal-quality indicator. When the signal-quality indicator indicates that the degree of similarity between the DCI signal and the de-rate matching signal of the DCI signal is lower than a first threshold, the first control unit 130 determines to stop the current decoding operation. The first threshold is set according to the design requirement or pre-setted based on the experience or other information, without limitation for the present invention. According to some embodiments, the first control module 13 may disable either one or both of the decoder 14 and the de-rate matching module 16 to stop the current decoding operation.

According to an embodiment, the similarity calculation performed by the signal-quality generation module 12 is achieved by performing a correlation operation on the DCI signal presenting before the de-rate matching operation and its de-rate matching signal. The similarity indicator may be the ratio of the DCI signal and its de-rate matching signal. In cases where the ratio is lower than a threshold value, that means the relevancy between the DCI signal and its de-rate matching signal is low, and the degree of similarity between them is low. That is, the quality of the DCI signal which is currently being processed is poor. In this case, the first control module 13 can determine to stop the decoding operation on the de-rate matching signal of the current DCI signal. According to another embodiment, the similarity calculation performed by the signal-quality generation module 12 is achieved by performing a differential operation on the DCI signal and its de-rate matching signal. The similarity indicator may be the differential value between the DCI signal before the de-rate matching operation and a de-rate matching average signal of the DCI signal. The de-rate matching average signal could be an average value of the de-rate matching signal of the DCI signal in a predetermined period. In cases where the differential value is higher than a threshold value, that means the difference between the DCI signal before the de-rate matching operation and the de-rate matching signal obtained by the de-rate matching operation is big, and the degree of similarity between them is low. That is, the quality of the DCI signal which is currently being processed is poor. In this case, the first control module 13 can determine to stop the decoding operation on the de-rate matching signal of the current DCI signal. Please note that the above embodiments are only illustrative of the present invention without limitation. Other similarity calculation methods known by those skilled in the art can also be applied to calculate the similarity between the DCI signal before the de-rate matching operation and its de-rate matching signal.

As shown in FIG. 1, according to an embodiment, the signal processing device 100 may further comprise a cyclic redundancy check (CRC) circuit 101. The CRC circuit 101 performs a CRC check on the DCI decoding signal output from the decoding module 102 for checking the correctness of the DCI decoding signal. Only when the DCI decoding signal passes the CRC check, the DCI decoding signal can be used for the following processes, so that the communication device can control the transmission and reception of the data signals based on the DCI decoding signal which has passed the CRC check.

According to the embodiments, the similarity calculation is adopted by the signal processing device 100 as a manner for estimating the quality of the DCI signal before and after the de-rate matching operation to obtain one quality estimation index. When at least one signal-quality indicator generated by the signal-quality generation module 12 indicates that the degree of similarity between the DCI signal before the de-rate matching operation and the de-rate matching signal of the DCI signal is low, the signal processing device 100 can stop the decoding operation on the de-rate matching signal of the DCI signal which is indicated with poor quality. Thus, the number of times required to perform the decoding operation is decreased, which avoids or reduces unnecessary power consumption and thus enhances the signal detection efficiency.

Figure 2:
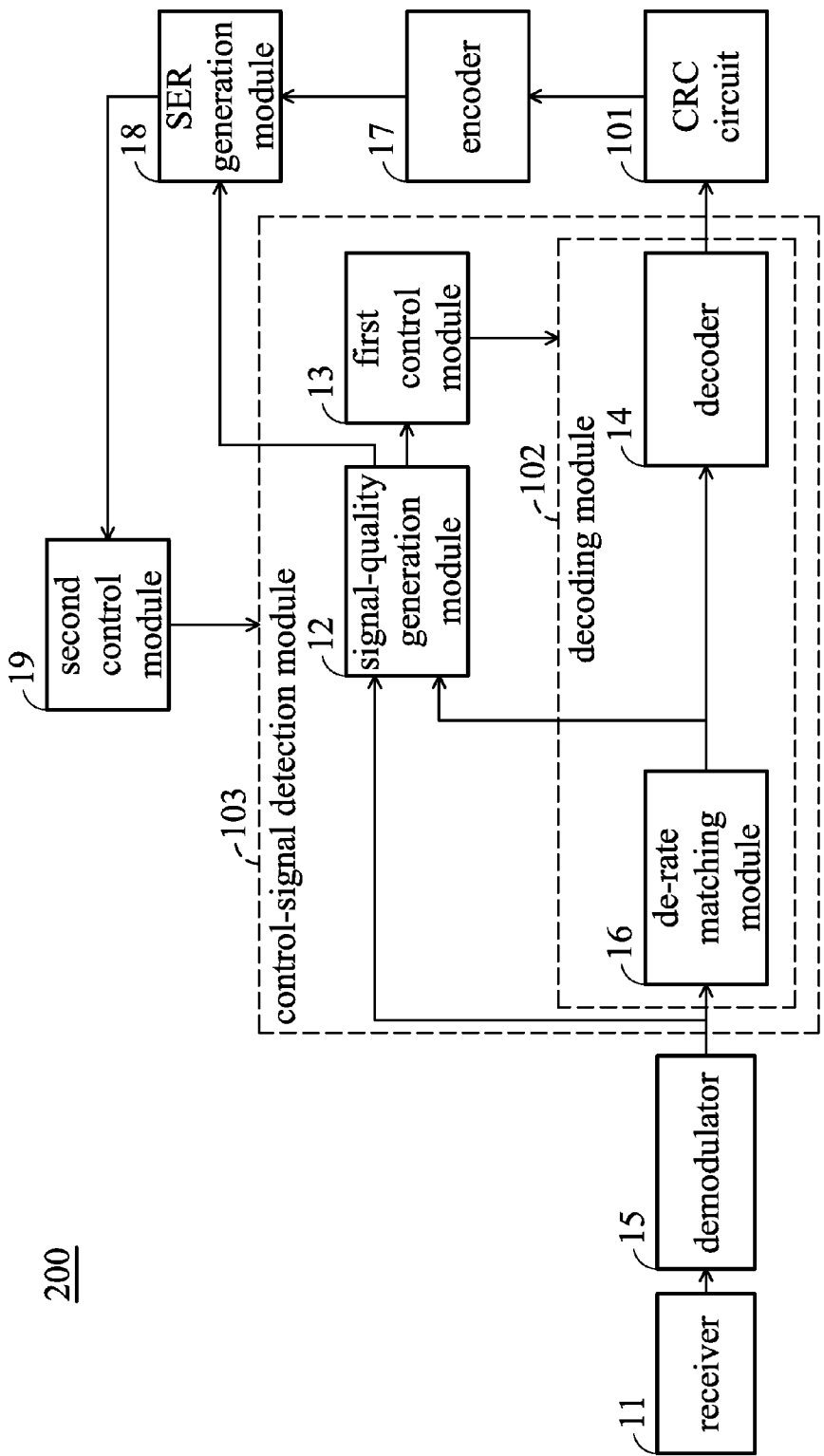
FIG. 2 shows another exemplary embodiment of a signal processing device.

FIG. 2 shows another exemplary embodiment of a signal processing device 200. Referring to FIG. 2, the signal processing device 200 is a communication device or a portion of the communication device. The communication device can be a notebook computer, a mobile phone, a personal digital assistant, a desktop computer, or another similar device, without for the present invention. Note that some modules in FIG. 2 is labeled with the same reference numerals in FIG. 1. The modules labeled with the same numerals in FIGS. 1 and 2 can achieve the same functionality, but the corresponding hardware structures are not specifically limited. Compared with FIG. 1, the signal processing device 200 further comprises an encoder 17, a symbol error rate (SER) generation module 18, and a second control module 19. The encoder 17 is coupled to the decoder 14. The encoder 17 re-encodes the DCI decoding signal output by the decoder 14 to obtain a re-encoded signal of the DCI decoding signal. The SER generation module 18 is coupled to the encoder 17 and the signal-quality generation module 12. The SER generation module 18 receives the de-rate matching signal of the DCI signal, the re-encoded signal of the DCI decoding signal, and the value indicating a number of the repetition times of the DCI signal in the de-rate matching operation generated by the signal-quality generation signal 12. The SER generation module 18 calculates the symbol error rate (SER) of the re-encoded signal against the de-rate matching signal according to the above value indicating the number of the repetition times. The value indicating the number of the repetition times is generated according to the DCI signal before the de-rate matching operation and its de-rate matching signal, and represents how many times the combination operation is performed on the DCI signal during the de-rate matching operation. The second control module 19 is coupled to the SER generation module 18 and the control signal detection module 103. According to an embodiment, the second control module 19 may disable either one or both of the decoder 14 and the de-rate matching module 16 to stop the detection and the decoding operation for the DCI signal.

In an embodiment, the signal processing device 200 further comprises a CRC circuit 101 coupled to the decoding module 102 and the encoder 17. The CRC circuit 101 performs a CRC check on the DCI decoding signal output by the decoding module 102 for checking the correctness of the DCI decoding signal. Only when the DCI decoding signal passes the CRC check, the DCI decoding signal can be used for the following processes, so that the communication device could control the transmission and reception of the data signals based on the DCI decoding signal which has passed the CRC check. In the embodiment, the CRC circuit 101 performs the CRC check on the DCI decoding signal output by the decoder 14. The CRC circuit 101 inputs the DCI decoding signal which has successfully passed the CRC check to the encoder 17, and the encoder 17 re-encodes the inputted DCI decoding signal to generate the re-encoded signal of the DCI decoding signal. After receiving the re-encoded signal, the de-rate matching signal of the DCI signal, and the value indicating the number of the repetition times of the DCI signal in the de-rate matching operation generated by the signal-quality generation signal 12, the SER generation module 18 calculates the symbol error rate (SER) of the re-encoded signal against the de-rate matching signal according to the above value indicating the number of the repetition times. The second control module 19 is coupled to the SER generation module 18 and determines whether to disable the control signal detection module 103 or not according to the calculated SER. Specifically, the second control module 19 compares the error rate with a second threshold. When the SER generated by the SER generation module 18 is lower than the second threshold, the second control module 19 determines to disable the control signal detection module 103. The second threshold is set according to the design requirement or pre-set by those skilled in the art based on the experience or other information, without limitation for the present invention. In accordance with one of the embodiments, the SER may comprise the bit error rate.

According to embodiments, the signal processing device 200 performs the similarity calculation operation which is one of several manners for estimating the quality of the DCI signal before and after the de-rate matching operation to obtain one quality estimation index for stopping performing the decoding operation on the DCI signal with poor quality. Thus, the time for the decoding operation is reduced. Moreover, the error rate of the re-encoded signal of the DCI decoding signal against the de-rate matching signal is estimated. When the estimated error rate is within an acceptable range (for example, the error rate is lower than a threshold), the detection and the decoding operation for the DCI signal could be stopped in advance, which reduces the time required for the decoding operation on the DCI signal, avoids or reduces the wastage of resources, and enhances the signal detection efficiency.

The signal processing devices 100 and 200 in the above embodiments and related signal processing methods in the following embodiments are described in accordance with embodiments incorporating with the above terminal devices (e.g. UE) which deal with DCI signals. However, the present inventions are not limited thereto. According the at least some of the other embodiments, the signal processing devices 100 and 200 and the related signal processing methods could also be applied with base stations which deal with uplink control information (UCI) signals sent on physical uplink control channels (PUCCHs). The embodiments are described below.

Referring to FIG. 1, a signal processing device 100 of an embodiment is a communication device or a portion of the communication device. The communication device can be a base station (BS), a node B (NB), an evolved node B (e-NB), or similar. As shown in FIG. 1, the signal processing device 100 comprises a receiver 11, a demodulator 15, and a control-signal detection module 103. The receiver 11 may comprise a RF module (not shown) and a baseband module (not shown) for receiving the uplink signal from a network terminal and performs an RF process and baseband process on the received signal. For example, the receiver 11 converts an RF signal, which is received through an antenna, to a baseband signal and performs a baseband process on the baseband signal. The baseband process includes, for example, ADC conversion, gain adjustment, modulation, decoding, and the like. The receiver 11 may comprise a plurality of hardware components for performing RF conversion and baseband-signal processing. According to an exemplary embodiment, the receiver 11 may also comprise at least one antenna. The demodulator 15 is coupled to the receiver 11. The demodulator 15 demodulates the uplink signal from the receiver 11, which has been processed by the RF process and the baseband process, to obtain an uplink control information (UCI) signal transmitted on the PUCCH. Further, the obtained DCI signal is transmitted to a decoding module 102 in the control-signal detection module 103 for a decoding process.

In the embodiment, the control-signal detection module 103 is configured to detect the UCI signal transmitted on the PDCCH and decode the DCI signal. As shown in FIG. 1, the control-signal detection module 103 comprises a decoding module 102, a signal-quality generation module 12, and a first control module 13. The decoding module 102 receives the UCI signal which is obtained through the demodulation operation and performs a decoding operation on the UCI signal. The decoding module 102 comprises a de-rate matching module 16 and decoder 14. The de-rate matching module 16 is used to perform a de-rate matching operation on the DCI signal which obtained after the demodulation operation to obtain a de-rate matching signal of the UCI signal. The decoder 14 is coupled to the de-rate matching module 16 for decoding the de-rate matching signal to obtain an UCI decoding signal. As shown in FIG. 1, the signal-quality generation module 12 is coupled to the de-rate matching module 16 for receiving the UCI signals before and after the de-rate matching process. The signal-quality generation module 12 generates at least one signal-quality indicator according to the UCI signal before the de-rate matching operation and the de-rate matching signal of the UCI signal. The first control module 13 is coupled to the signal-quality generation module 12 and the decoding module 102, and used for determining and controlling whether to stop the current decoding operation according to the signal-quality indicator.

According to an embodiment, the signal-quality generation module 12 performs a similarity calculation operation on the UCI signal presenting before the de-rate matching operation and the de-rate matching signal of the UCI signal to obtain a similarity indicator. The similarity indicator can be involved in the signal-quality indicator. When the signal-quality indicator indicates that the degree of similarity between the UCI signal and the de-rate matching signal of the UCI signal is lower than a third threshold, the first control unit 130 determines to stop the current decoding operation for the de-rate matching signal of the current UCI signal. The third threshold is set according to the design requirement or pre-set on the experience or other information, without limitation for the present invention. According to some embodiments, the first control module 13 may disable either one or both of the decoder 14 and the de-rate matching module 16 to stop the current decoding operation.

According to an embodiment, the similarity calculation operation performed by the signal-quality generation module 12 is achieved by performing a correlation operation on the UCI signal presenting before the de-rate matching operation and its de-rate matching signal. The similarity indicator may be the ratio of the UCI signal presenting before the de-rate matching operation and its de-rate matching signal. In cases where the ratio is lower than a threshold value, that means the relevancy between the UCI signal and the de-rate matching signal of the UCI signal is low, and the degree of similarity between them is low. That is, the quality of the UCI signal which is currently being processed is poor. In this case, the first control module 13 can determine to stop the decoding operation on the de-rate matching signal of the current UCI signal. According to another embodiment, the similarity calculation operation performed by the signal-quality generation module 12 is achieved by performing a differential operation on the UCI signal before the de-rate matching operation and its de-rate matching signal. The similarity indicator may be the differential value between the UCI signal before the de-rate matching operation and a de-rate matching average signal of the UCI signal. The de-rate matching average signal could be an average value of the de-rate matching signal of the UCI signal in a predetermined period. In cases where the differential value is higher than a threshold value, that means the difference between the UCI signal before the de-rate matching operation and the de-rate matching signal obtained by the de-rate matching operation is big, and the degree of similarity between them is low. That is, the quality of the DCI signal which is currently being processed is poor. In this case, the first control module 13 can determine to stop the decoding operation on the de-rate matching signal of the current UCI signal. Please note that the above embodiments are only illustrative of the present invention without limitation. Other similarity calculation methods known by those skilled in the art can also be applied to calculate the similarity between the UCI signal before the de-rate matching operation and the de-rate matching signal of the UCI signal.

As shown in FIG. 1, according to an embodiment, the signal processing device 100 may further comprise a CRC circuit 101. The CRC circuit 101 performs a CRC check on the UCI decoding signal output from the decoding module 102 for checking the correctness of the UCI decoding signal. Only when the UCI decoding signal passes the CRC check, the UCI decoding signal can be used for the following processes, so that the communication device can control the transmission and reception of the data signals based on the UCI decoding signal which has passed the CRC check.

According to the embodiments, the similarity calculation is adopted by the signal processing device 100 as a manner for estimating the quality of the UCI signal before and after the de-rate matching operation to obtain one quality estimation index. When at least one signal-quality indicator generated by the signal-quality generation module 12 indicates that the degree of similarity between the UCI signal before the de-rate matching operation and the de-rate matching signal of the UCI signal is low, the signal processing device 100 can stop the decoding operation on the de-rate matching signal of the UCI signal which is indicated with poor quality. Thus, the number of times required to perform the decoding operation is decreased, which avoids or reduces unnecessary power consumption and thus enhances the signal detection efficiency.

FIG. 2 shows another exemplary embodiment of a signal processing device 200. Referring to FIG. 2, the signal processing device 200 is a communication device or a portion of the communication device. The communication device can be a base station, a node B (NB), an evolved node B (e-NB), or another similar device, without limitation for the present invention. Compared with FIG. 1, the signal processing device 200 further comprises an encoder 17, an SER generation module 18, and a second control module 19. The encoder 17 is coupled to the decoder 14. The encoder 17 re-encodes the UCI decoding signal output by the decoder 14 to obtain a re-encoded signal of the UCI decoding signal. The SER generation module 18 is coupled to the encoder 17 and the signal-quality generation module 12. The SER generation module 18 receives the de-rate matching signal of the UCI signal, the re-encoded signal of the UCI decoding signal, and the value indicating a number of the repetition times of the UCI signal in the de-rate matching operation generated by the signal-quality generation signal 12. The SER generation module 18 calculates the symbol error rate (SER) of the re-encoded signal against the de-rate matching signal according to the above value indicating the number of the repetition times. The value indicating the number of the repetition times is generated according to the UCI signal before the de-rate matching operation and its de-rate matching signal, and represents how many times the combination operation is performed on the UCI signal during the de-rate matching operation. The second control module 19 is coupled to the SER generation module 18 and the control signal detection module 103. According to an embodiment, the second control module 19 may disable either one or both of the decoder 14 and the de-rate matching module 16 to stop the detection and the decoding operation for the UCI signal.

In an embodiment, the signal processing device 200 further comprises a CRC circuit 101 coupled to the decoding module 102 and the encoder 17. In the embodiment, the CRC circuit 101 performs the CRC check on the UCI decoding signal output by the decoder 14. The CRC circuit 101 inputs the UCI decoding signal which has passed the CRC check to the encoder 17, and the encoder 17 re-encodes the UCI decoding signal to generate the re-encoded signal of the UCI decoding signal. After receiving the re-encoded signal, the de-rate matching signal of the UCI signal, and the value indicating the number of the repetition times of UCI signal in the de-rate matching operation generated by the signal-quality generation signal 12, the SER generation module 18 calculates the symbol error rate (SER) of the re-encoded signal against the de-rate matching signal according to the above value indicating the number of the repetition times. The second control module 19 is coupled to the SER generation module 18 and determines whether to disable the control signal detection module 103 or not according to the calculated SER. Specifically, the second control module 19 compares the error rate with a fourth threshold. When the SER generated by the SER generation module 18 is lower than the fourth threshold, the second control module 19 determines to disable the control signal detection module 103. The fourth threshold is set according to the design requirement or pre-set by those skilled in the art based on the experience or other information, without limitation for the present invention.

According to embodiments, the signal processing device 200 performs the similarity calculation operation which is one of several manners for estimating the quality of the UCI signal before and after the de-rate matching operation to obtain one quality estimation index for stopping performing the decoding operation on the UCI signal with poor quality. Thus, the time for the decoding operation is reduced. Moreover, the error rate of the re-encoded signal of the DCI decoding signal against the de-rate matching signal is estimated. When the estimated error rate is within an acceptable range (for example, the error rate is lower than a threshold), the detection and the decoding operation for the UCI signal could be stopped in advance, which reduces the time required for the decoding operation on the UCI signal, avoids or reduces the wastage of resources, and enhances the signal detection efficiency.

Figure 3A:
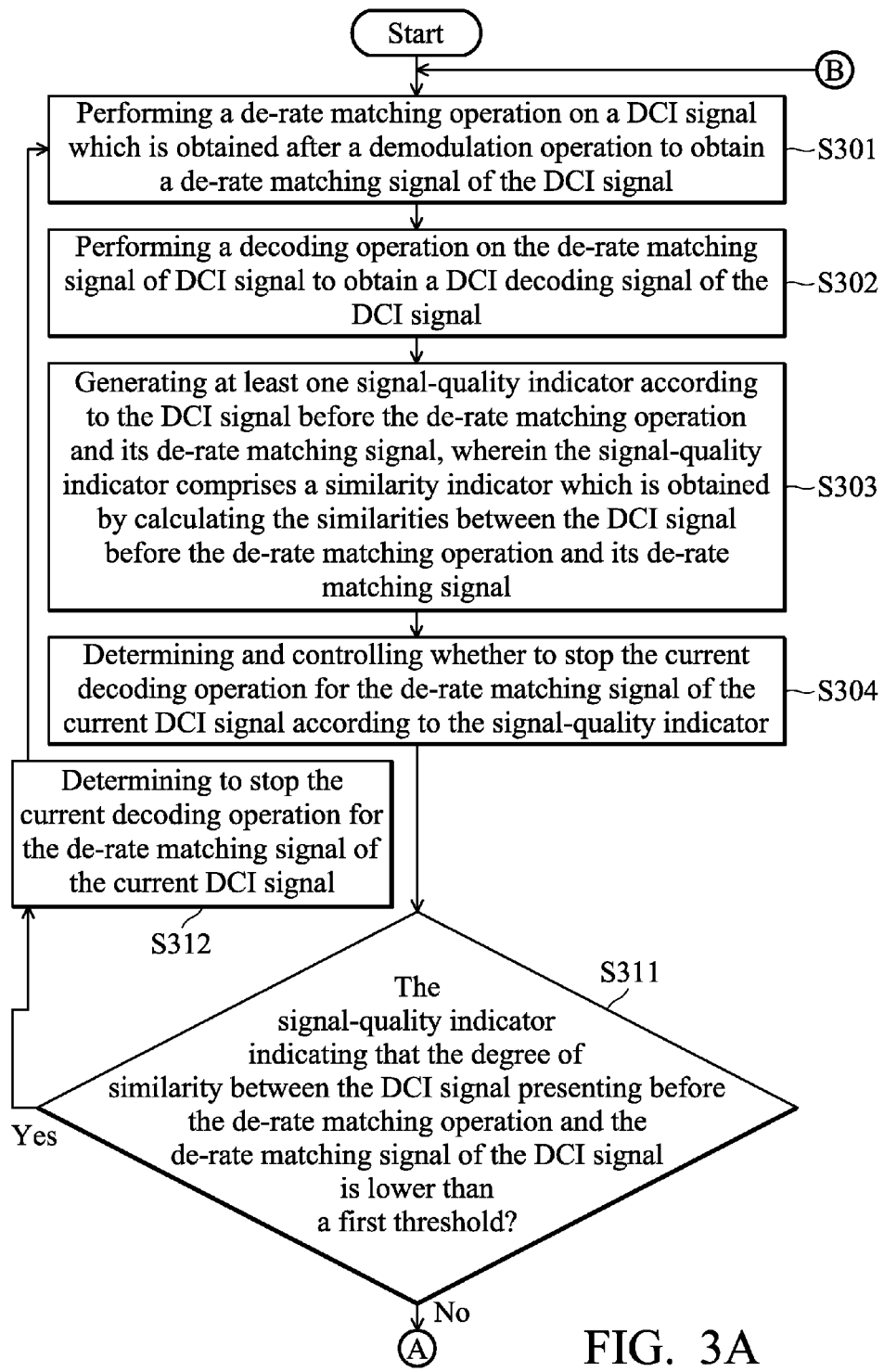
FIGS. 3A and 3B show one exemplary embodiment of a signal processing method.
Figure 3B:
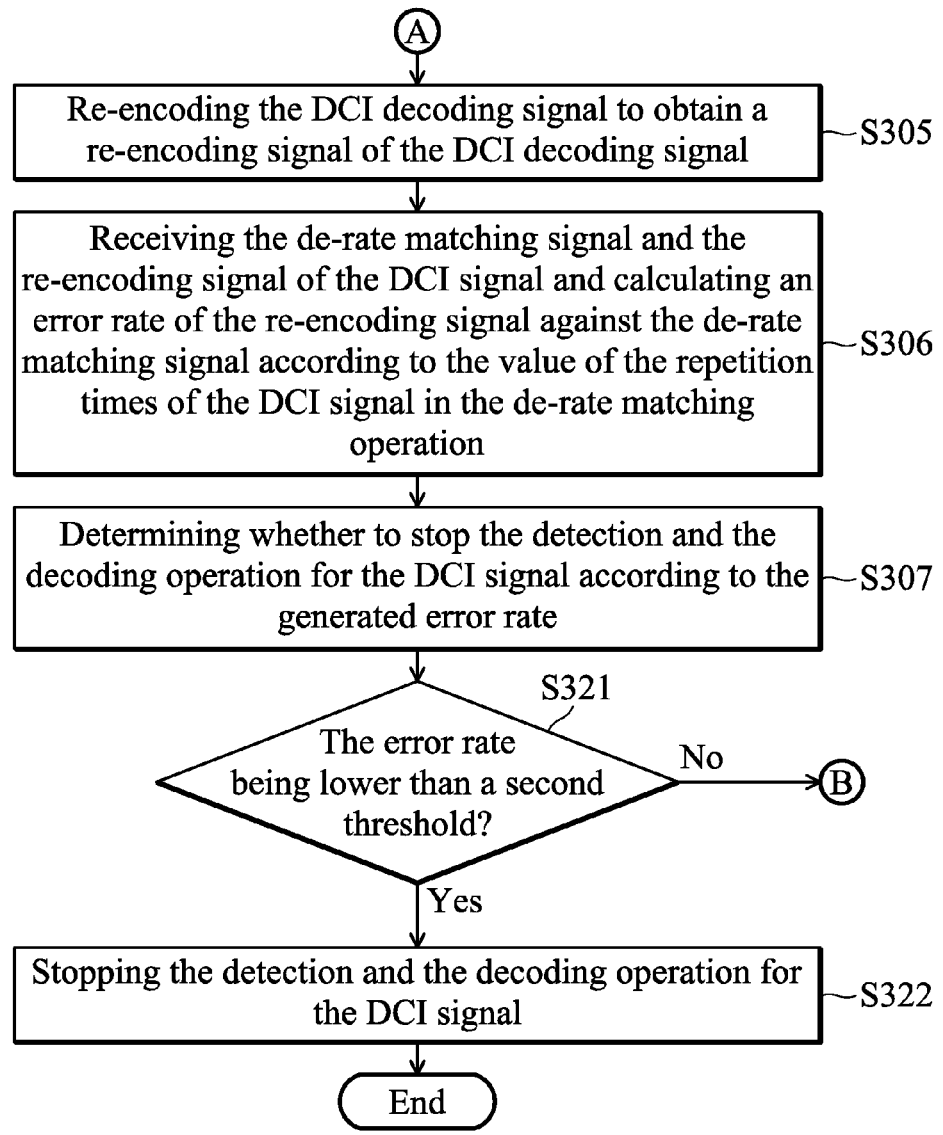

FIGS. 3A and 3B shows a flow chart of an exemplary embodiment of a signal processing method 300. The signal processing method 300 will be described by referring to the signal processing device 100 of FIG. 1 and the signal processing device 200 of FIG. 2. In the embodiment, the signal processing method 300 is applied to a communication device and to detect and decode a DCI signal transmitted on the PDCCH through the control-signal detection module 103. The communication device can be a notebook computer, a mobile phone, a personal digital assistant, or another similar device, however, without limitation for the present invention. As shown in FIGS. 3A and 3B, the signal processing method comprises the following steps:

S301: performing a de-rate matching operation on a DCI signal which is obtained after a demodulation operation to obtain a de-rate matching signal of the DCI signal. According to an embodiment, the DCI signal in the step S301 can be obtained by demodulating the downlink signal which has suffered the RF process and the baseband process through the demodulator 15 of FIG. 1.

S302: performing a decoding operation on the de-rate matching signal of DCI signal to obtain a DCI decoding signal of the DCI signal.

S303: generating at least one signal-quality indicator according to the DCI signal before the de-rate matching operation and its de-rate matching signal. The signal-quality indicator comprises a similarity indicator which is obtained by calculating the similarities between the DCI signal before the de-rate matching operation and its de-rate matching signal. According to an embodiment, the similarity calculation operation performed by the signal-quality generation module 12 is achieved by performing a correlation operation on the DCI signal before the de-rate matching operation and its de-rate matching signal. The similarity indicator may be the ratio of the DCI signal before the de-rate matching operation and its de-rate matching signal. In an embodiment, the similarity calculation operation performed by the signal-quality generation module 12 is achieved by performing a differential operation on the DCI signal before the de-rate matching operation and its de-rate matching signal. The similarity indicator may be the differential value between the DCI signal before the de-rate matching operation and a de-rate matching average signal of the DCI signal before the de-rate matching operation. The de-rate matching average signal represents the average value of the de-rate matching signal of the DCI signal in a predetermined period. Please note that the above embodiments are only illustrative of the present invention without limitation. Other similarity calculation methods could also be applied to measure the similarity between the DCI signal before the de-rate matching operation and its de-rate matching signal.

S304: determining and controlling whether to stop the current decoding operation for the de-rate matching signal of the current DCI signal according to the signal-quality indicator. Specifically, according to an embodiment, when the signal-quality indicator indicates that the degree of similarity between the DCI signal before the de-rate matching operation and the de-rate matching signal of the DCI signal is lower than a first threshold (the determination result "Yes" of the step S311), the first control unit 13 determines to stop the current decoding operation for the de-rate matching signal of the current DCI signal (step S312). Then, the method 300 proceeds to the step S301, and the steps S302-S311 are repeated for processing the following modulated DCI signals until the signal-quality indicator indicates that the degree of similarity between the DCI signal before the de-rate matching operation and the de-rate matching signal of the DCI signal is not lower than the first threshold (the determination result "No" of the step S311. The first threshold is set according to the design requirement or pre-set by those skilled in the art based on the experience or other information, without limitation for the present invention. Moreover, the first control module 13 may disable either one or both of the decoder 14 and the de-rate matching module 16 to stop the current decoding operation.

According to an embodiment, the signal processing method 300 further comprises the following steps:

S305: re-encoding the DCI decoding signal to obtain a re-encoded signal of the DCI decoding signal. According to an embodiment, before the DCI decoding signal is re-encoded, a CRC check can be performed on the DCI decoding signal (not shown in FIGS. 3A and 3B). As shown in FIG. 2, before the DCI decoding signal output from the decoder 14 is input to the encoder 17, the DCI decoding signal is input to the CRC circuit 101 for the CRC check. The encoder can re-encode the DCI decoding signal which has passed the CRC check.

S306: receiving the de-rate matching signal and the re-encoded signal of the DCI signal and calculating an error rate of the re-encoded signal against the de-rate matching signal according to the value of the repetition times of the DCI signal in the de-rate matching operation. The value of the repetition times is generated by the signal-quality generation signal 12 according to the DCI signal before the de-rate matching operation and its de-rate matching signal to represent how many times the combination operation is performed on the DCI signal during the de-rate matching operation.

S307: determining whether to stop the detection and the decoding operation for the DCI signal according to the generated error rate (i.e. SER). The second control module 19 in FIG. 2 determines whether to stop the detection and the decoding operation for the DCI signal according to the error rate generated by the SER generation module 18. Specifically, the second control module 19 compares the error rate with a second threshold. When the error rate generated by the SER generation module 18 is not lower than the second threshold (the determination result "No" of the step S321), the second control module 19 does not stop the detection and the decoding operation for the DCI signal. The signal processing device 200 performs the detection and the decoding operation on the DCI signal continuously by repeating the above steps. When the error rate generated by the SER generation module 18 is lower than the second threshold (the determination result "Yes" of the step S321), the second control module 19 determines to stop the detection and the decoding operation for the DCI signal (step S322). The second threshold is set according to the design requirement or pre-set by those skilled in the art based on the experience or other information, without limitation for the present invention. The second control module 19 may disable either one or both of the de-rate matching operation and the decoding operation to stop the detection and the decoding operation for the DCI signal.

Figure 4A:
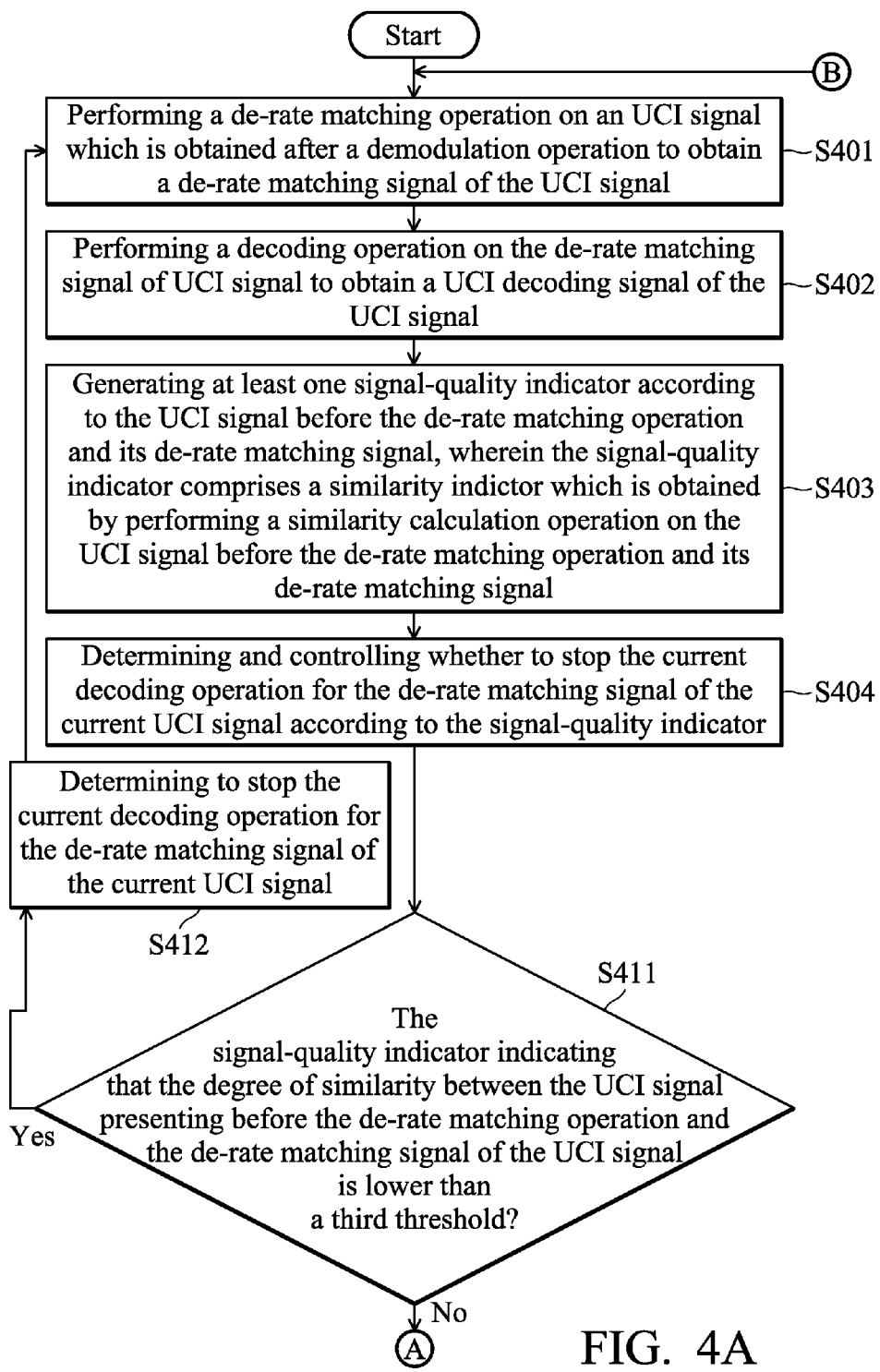
FIGS. 4A and 4B show another exemplary embodiment of a signal processing method.
Figure 4B:
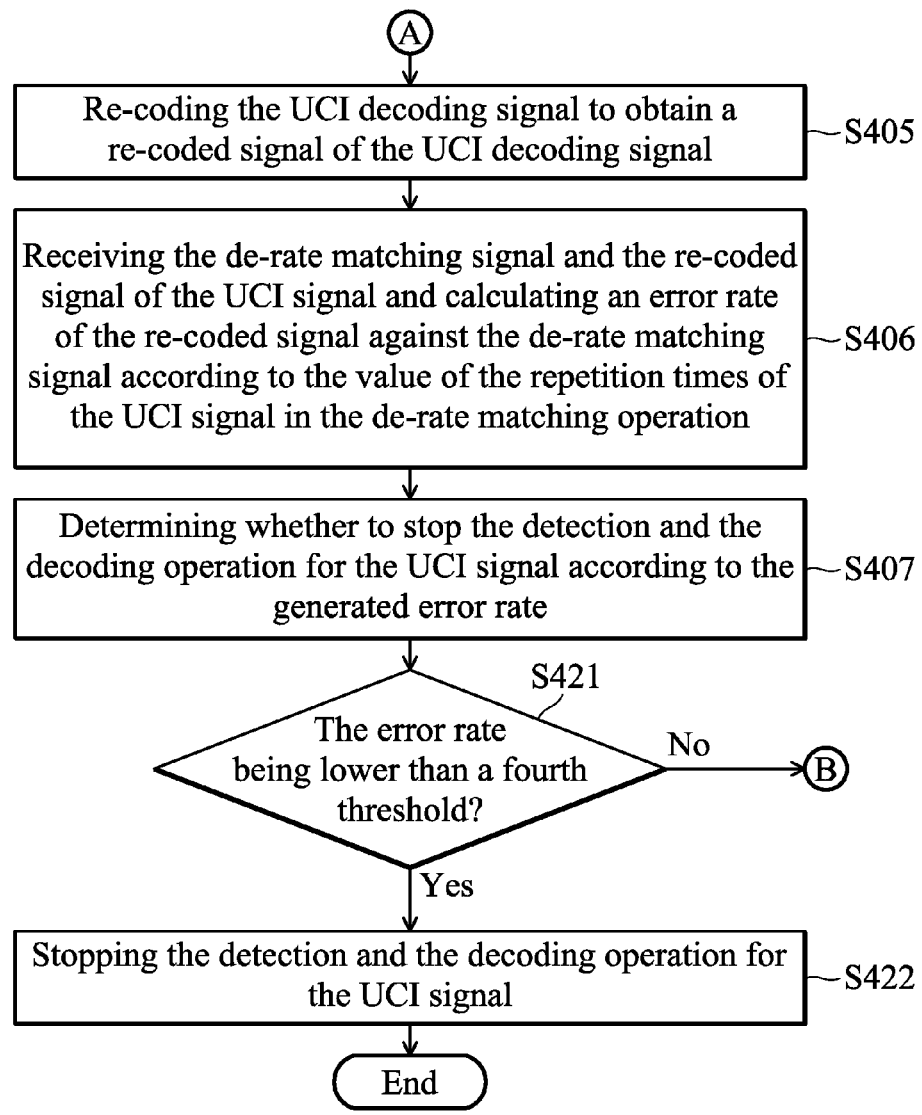

FIGS. 4A and 4B show a flow chart of anther exemplary embodiment of a signal processing method 400. The signal processing method 400 will be described by referring to the signal processing device 100 of FIG. 1 and the signal processing device 200 of FIG. 2. In the embodiment, the signal processing method 300 is applied to a communication device and to detect and decode an UCI signal transmitted on the PUCCH through the control-signal detection module 103. The communication device can be a base station, a node B (NB), an evolved node B (e-NB), or another similar device, however, without limitation for the present invention. As shown in FIGS. 4A and 4B, the signal processing method comprises the following steps:

S401: performing a de-rate matching operation on an UCI signal which is obtained after a demodulation operation to obtain a de-rate matching signal of the UCI signal. According to an embodiment, the UCI signal in the step S401 can be obtained by demodulating the uplink signal which has suffered the RF process and the baseband process through the demodulator 15 of FIG. 1.

S402: performing a decoding operation on the de-rate matching signal of UCI signal to obtain a UCI decoding signal of the UCI signal.

S403: generating at least one signal-quality indicator according to the UCI signal before the de-rate matching operation and its de-rate matching signal. The signal-quality indicator comprises a similarity indictor which is obtained by performing a similarity calculation operation on the UCI signal before the de-rate matching operation and its de-rate matching signal. According to an embodiment, the similarity calculation operation performed by the signal-quality generation module 12 is achieved by performing a correlation operation on the UCI signal before the de-rate matching operation and its de-rate matching signal. The similarity indicator may be the ratio of the UCI signal before the de-rate matching operation and its de-rate matching signal. In an embodiment, the similarity calculation operation performed by the signal-quality generation module 12 is achieved by performing a differential operation on the UCI signal before the de-rate matching operation and its de-rate matching signal. The similarity indicator may be the differential value between the UCI signal before the de-rate matching operation and a de-rate matching average signal of the UCI signal before the de-rate matching operation. The de-rate matching average signal represents the average value of the de-rate matching signal of the UCI signal in a predetermined period. Please note that the above embodiments are only illustrative of the present invention without limitation. Other similarity calculation methods known by those skilled in the art can be applied to measure the similarity between the UCI signal before the de-rate matching operation and its de-rate matching signal.

S404: determining and controlling whether to stop the current decoding operation for the de-rate matching signal of the current UCI signal according to the signal-quality indicator. Specifically, according to an embodiment, when the signal-quality indicator indicates that the degree of similarity between the UCI signal before the de-rate matching operation and the de-rate matching signal of the UCI signal is lower than a third threshold (the determination result "Yes" of the step S411), the first control unit 130 determines to stop the current decoding operation for the de-rate matching signal of the current UCI signal (step S412). Then, the method 400 proceeds to the step S401, and the steps S402-S411 are repeated for processing the following modulated UCI signals until the signal-quality indicator indicates that the degree of similarity between the UCI signal before the de-rate matching operation and the de-rate matching signal of the UCI signal is not lower than the third threshold (the determination result "No" of the step S411). The third threshold is set according to the design requirement or pre-set by those skilled in the art based on the experience or other information, without limitation for the present invention. Moreover, the first control module 13 may disable either one or both of the decoder 14 and the de-rate matching module 16 to stop the current decoding operation.

According to an embodiment, the signal processing method 400 further comprises the following steps:

S405: re-encoding the UCI decoding signal to obtain a re-encoded signal of the UCI decoding signal. According to an embodiment, before the UCI decoding signal is re-encoded, a CRC check can be performed on the UCI decoding signal (not shown in FIGS. 4A and 4B). As shown in FIG. 2, before the UCI decoding signal output from the decoder 14 is input to the encoder 17, the UCI decoding signal is input to the CRC circuit 101 for the CRC check. The encoder can re-encode the UCI decoding signal which has passed the CRC check.

S406: receiving the de-rate matching signal and the re-encoded signal of the UCI signal and calculating an error rate of the re-encoded signal against the de-rate matching signal according to the value of the repetition times of the UCI signal in the de-rate matching operation. The value of the repetition times is generated by the signal-quality generation signal 12 according to the UCI signal before the de-rate matching operation and its de-rate matching signal to represent how many times the combination operation is performed on the UCI signal during the de-rate matching operation.

S407: determining whether to stop the detection and the decoding operation for the UCI signal according to the generated error rate. The second control module 19 in FIG. 2 determines whether to stop the detection and the decoding operation for the UCI signal according to the error rate generated by the SER generation module 18. Specifically, the second control module 19 compares the error rate with a fourth threshold. When the error rate generated by the SER generation module 18 is not lower than the fourth threshold (the determination result "No" of the step S421), the second control module 19 does not stop the detection and the decoding operation for the UCI signal. The signal processing device 200 performs the detection and the decoding operation on the UCI signal continuously by repeating the above steps. When the error rate generated by the SER generation module 18 is lower than the fourth threshold (the determination result "Yes" of the step S421), the second control module 19 determines to stop the detection and the decoding operation for the UCI signal (step S422). The fourth threshold is set according to the design requirement or pre-set by those skilled in the art based on the experience or other information, without limitation for the present invention. The second control module 19 may disable either one or both of the de-rate matching operation and the decoding operation to stop the detection and the decoding operation for the UCI signal.

According to embodiments, the signal processing devices and methods perform the similarity calculation operation which is one of several manners for estimating the quality of the control (DCI/UCI) signal before and after the de-rate matching operation to obtain one quality estimation index for stopping performing the decoding operation on the control signal with worse quality. Thus, the number of times that the decoding operation is performed unnecessarily is decreased. Moreover, the error rate of the re-encoded signal of the decoding signal of the control signal against the de-rate matching signal is estimated. When the estimated error rate is within an acceptable range (for example, the error rate is lower than a threshold), the detection and the decoding operation for the control (DCI/UCI) signal is stopped, which decreases the number of times required to perform the decoding operation on the control (DCI/UCI) signal, avoids or reduces the wastage of resources, and enhances the signal detection efficiency.

The above integration units implemented in the form of software functional units may be stored in a computer readable storage medium. The software functional units are stored in a storage medium and include several instructions to instruct a computer device (a personal computer, server, or network equipment) or a processor to perform some of the steps of the method in the embodiments. The storage media includes USB flash drive, removable hard disk, read-only memory (ROM), a random access memory (RAM), magnetic disk, an optical disk, or any media which is capable of storing program codes.

Any of the signal-quality generation module 12, the first control module 13, the de-rate matching module 16, the SER generation module 18, and the second control module 19 may be implemented in numerous ways, such as with logic circuits, with dedicated hardware, or with general-purpose hardware (e.g., a single processor, multiple processors or graphics processing units capable of parallel computations, or others) that is programmed using microcode or software instructions to perform the functions recited herein.

Some or all of the functionalities of any of the receiver 11, the decoder 14, the demodulator 15, the encoder 17, and the CRC circuit 101 may be contemplated in dedicated hardware, or with general-purpose hardware (e.g., a single processor, multiple processors or graphics processing units capable of parallel computations, or others) that is programmed using microcode or software instructions to perform the functions recited herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A signal processing device for communication, comprising:
    a control-signal detection module, configured for detecting and decoding a control signal, wherein the control-signal detection module comprises:
        a de-rate matching module, configured for performing a de-rate matching operation on the demodulated control signal which is obtained after a demodulation operation to obtain a de-rate matching signal of the demodulated control signal;
        a decoder, coupled to the de-rate matching module, configured for performing a decoding operation on the de-rate matching signal to obtain a decoding signal of the control signal;
        a signal-quality generation module, coupled to the de-rate matching module, configured for generating at least one signal-quality indicator according to the control signal and the de-rate matching signal of the control signal, wherein the at least one signal-quality indicator comprises a similarity indicator which is obtained by the signal-quality generation module performing a similarity calculation operation on the demodulated control signal and the de-rate matching signal; and
        a first control module, coupled to the signal-quality generation module and the decoder, configured for determining and controlling whether to stop the decoding operation for the de-rate matching signal of the current control signal according to the at least one signal-quality indicator.

2. The signal processing device as claimed in claim 1 further comprising:
    a demodulator, coupled to the de-rate matching module, configured for demodulating a received signal to obtain the demodulated control signal.

3. The signal processing device as claimed in claim 1, wherein the similarity calculation operation performed by the signal-quality generation module is achieved by performing a correlation operation on the demodulated control signal and the de-rate matching signal, and the similarity indicator comprises a ratio of the demodulated control signal and the de-rate matching signal.

4. The signal processing device as claimed in claim 1, wherein the similarity calculation operation performed by the signal-quality generation module is achieved by performing a differential operation on the demodulated control signal and the de-rate matching signal, the similarity indicator comprises a differential value between the demodulated control signal and a de-rate matching average signal, and the de-rate matching average signal is an average value of the de-rate matching signal of the control signal in a predetermined period.

5. The signal processing device as claimed in claim 1, wherein when the at least one signal-quality indicator indicates that a degree of similarity between the demodulated control signal and the de-rate matching signal is lower than a first threshold, the first control unit determines to stop the current decoding operation.

6. The signal processing device as claimed in claim 5, wherein the first control module disables either one or both of the decoder and the de-rate matching module to stop the decoding operation for the de-rate matching signal of the current control signal.

7. The signal processing device as claimed in claim 1 further comprising:
    an encoder, coupled to the decoder, configured for re-encoding the decoding signal of the control signal to obtain a re-encoded signal;
    a symbol error rate generation module, coupled to the encoder and the signal-quality generation module, configured for receiving the de-rate matching signal of the control signal, the re-encoded signal, and a value of repetition times of the control signal, and calculating an error rate of the re-encoded signal against the de-rate matching signal according to the value of the repetition times, wherein the value of the repetition times is generated by the signal-quality generation signal according to the demodulated control signal and the de-rate matching signal of the control signal; and
    a second control module, coupled to the symbol error rate generation module and the control-signal detection module, configured for determining whether to disable the control-signal detection module according to the error rate.

8. The signal processing device as claimed in claim 7 further comprising:
    a cyclic redundancy check module, coupled to the decoder and the encoder, configured for performing a cyclic redundancy check on the decoding signal of the control signal and inputting the control signal which has passed the cyclic redundancy check to the encoder.

9. The signal processing device as claimed in claim 8, wherein the second control module disables either one or both of the decoder and the de-rate matching module to disable the control-signal detection module.

10. The signal processing device as claimed in claim 1, wherein the control signal is a downlink control information (DCI) signal transmitted on a physical downlink control channel (PDCCH) or an uplink control information (UCI) signal transmitted on a physical uplink control channel (PUCCH).

11. A signal processing method for communication, comprising:
    detecting and decoding a control signal, wherein the step of detecting and decoding the control signal comprises:
    performing a de-rate matching operation on the demodulated control signal which is obtained after a demodulation operation to obtain a de-rate matching signal of the control signal;
    performing a decoding operation on the de-rate matching signal to obtain a decoding signal of the control signal;
    generating at least one signal-quality indicator according to the demodulated control signal and the de-rate matching signal of the control signal, wherein the at least one signal-quality indicator comprises a similarity indicator which is obtained by performing a similarity calculation operation on the demodulated control signal and the de-rate matching signal; and determining and controlling whether to stop the decoding operation for the de-rate matching signal of the current control signal according to the at least one signal-quality indicator.

12. The signal processing method as claimed in claim 11, wherein the demodulated control signal is obtained by demodulating a received signal of the communication device.

13. The signal processing method as claimed in claim 11, wherein the similarity calculation operation is achieved by performing a correlation operation on the demodulated control signal and the de-rate matching signal, and the similarity indicator comprises a ratio of the demodulated control signal and the de-rate matching signal.

14. The signal processing method as claimed in claim 11, wherein the similarity calculation operation is achieved by performing a differential operation on the demodulated control signal and the de-rate matching signal, the similarity indicator comprises a differential value between the demodulated control signal and a de-rate matching average signal, and the de-rate matching average signal is an average value of the de-rate matching signal of the control signal in a predetermined period.

15. The signal processing method as claimed in claim 11, wherein when the at least one signal-quality indicator indicates that a degree of similarity between the demodulated control signal and the de-rate matching signal is lower than a first threshold, it is determined to stop the current decoding operation.

16. The signal processing method as claimed in claim 15, wherein the current decoding operation is stopped by disabling either one or both of the decoding operation and the de-rate matching operation.

17. The signal processing method as claimed in claim 11 further comprising:
   re-encoding the decoding signal of the control signal to obtain a re-encoded signal;
   receiving the de-rate matching signal of the control signal, the re-encoded signal, and a value of repetition times of the control signal and calculating an error rate of the re-encoded signal against the de-rate matching signal according to the value of the repetition times, wherein the value of the repetition times is generated by the signal-quality generation signal according to the demodulated control signal and the de-rate matching signal of the control signal; and
   determining whether to stop the step of detecting and decoding the control signal.

18. The signal processing method as claimed in claim 17 further comprising:
   before the step of re-encoding the decoding signal of the control signal, performing a cyclic redundancy check on the decoding signal of the control signal; and
   when the decoding signal passes the cyclic redundancy check, re-encoding the decoding signal which has passed the decoding signal.

19. The signal processing method as claimed in claim 18, wherein the step of detecting and decoding the control signal is stopped by disabling either one or both of the decoding operation and the de-rate matching operation.

20. The signal processing method as claimed in claim 11, wherein the control signal is a downlink control information (DCI) signal transmitted on a physical downlink control channel (PDCCH) or an uplink control information (UCI) signal transmitted on a physical uplink control channel (PUCCH).

* * * * *